June 10, 1941.　　　F. W. ROBERTS　　　2,244,965
HIGH SPEED FILM PRINTER
Filed May 1, 1939　　　2 Sheets-Sheet 2

INVENTOR.
FREDERICK W. ROBERTS
BY
ATTORNEY.

Patented June 10, 1941

2,244,965

UNITED STATES PATENT OFFICE 2,244,965

HIGH SPEED FILM PRINTER

Frederick William Roberts, New York, N. Y., assignor to Warner Bros. Pictures, Inc., New York, N. Y., a corporation of Delaware Application May 1, 1939, Serial No. 271,040

23 Claims. (Cl. 95—75)

This invention relates to printing apparatus for printing from one film to another and particularly refers to apparatus for printing motion picture films wherein the intensity of illumination of the printing light beam is varied throughout the printing operation.

In successively cinematographing different scenes, it is found that the average density of the resulting negative film or films obtained often varies from one scene to another due to variations in lighting, adjustment of the camera lens opening, camera speed, and the like. It is therefore necessary to control the density of the corresponding scenes throughout the resulting positive film, especially for adjacent scenes thereon so as to prevent any great change in density when passing from one scene to the next. Again, it may be desirable to change the density of a certain scene on the film to portray a particular dramatic effect.

A method commonly employed in controlling the average density of a positive print is to vary the intensity of illumination of the printing light beam during the printing operation. This is commonly accomplished by employing an automatically or semi-automatically operated rheostat in the printing lamp circuit wherein pre-set resistances are successively placed in the lamp circuit under control of notches provided along the negative film. These notches are previously placed along the negative at points where it is desired to change the printer light intensity. The resistances are either pre-arranged so that apparatus operated by the film notches merely switches these resistances in the lamp circuit or they are actually adjusted a certain amount by the apparatus operated by the film notches.

In any event, since an incandescent filament lamp is generally employed for printing, a certain length of time is required for the intensity of illumination of the printing lamp to change from one value to another, due to the thermal inertia of the lamp filament. Thus, where the motion picture films are run past the printing light beam at a relatively high speed, this lag in illumination response of the printing lamp prevents the desired printing illumination from being obtained at the start of each new scene or section on the film wherein the illumination is to be changed. For example, if the films being printed are run at 150 feet per minute, four or five film frames at the start of a new scene or section wherein the illumination is to be changed may pass the printing point before the printing illumination reaches the value determined for that particular new scene. Thus, these four or five film frames will be either over-exposed or under-exposed, depending on whether the printing illumination is decreased or increased for the new scene. Consequently, this lag or thermal inertia of an incandescent printing lamp limits the speed at which the printing machine can be run.

Furthermore, when running films during the printing operation at a relatively high speed, i. e. 150 to 200 feet per minute, a larger lamp having a heavier filament must be used than when the films are run at a slower speed due to the fact that the intensity of printing illumination must be increased as the film speeds are increased. Thus, the thermal inertia or lag is greater for high speed film printers due to the increased size of the lamp filament.

When controlling the illumination of the printing light beam, it is necessary to keep a constant check on the printing operation to make sure that the various elements of the printer are actuated correctly to obtain a correct exposure for each scene. This is especially true when the illumination is automatically controlled since, in that event, if one scene is printed with a wrong exposure, the remainder of the film scenes will also usually be printed with the wrong exposure, thereby ruining the remainder of the printed film. When the printing apparatus is run at a relatively slow speed, the operator can visually check the exposure of each of the various scenes against a table indicating the correct exposure for each scene. However, at relatively high printing speeds, this is practically impossible since a film scene may then pass through the printing apparatus in less than a second, which would be too fast to enable the operator to check the operation of the printing apparatus for that particular scene.

One object of the present invention is to quickly vary the intensity of illumination of a film exposing system.

Another object is to obtain a correct intensity of illumination of a printing light beam before printing with said beam.

Another object is to successively direct the light beams from a pair of printing lamps onto a pair of films to be printed.

Another object is to automatically employ alternate ones of a pair of printing lamps to print from one film to another when predetermined portions of one of the films passes a certain point.

Another object is to automatically stop a printing machine when a part thereof does not function properly.

The manner in which the above and other objects of the invention are accomplished will be readily understood on reference to the following specification read in conjunction with the accompanying drawings wherein.

Figure 4:
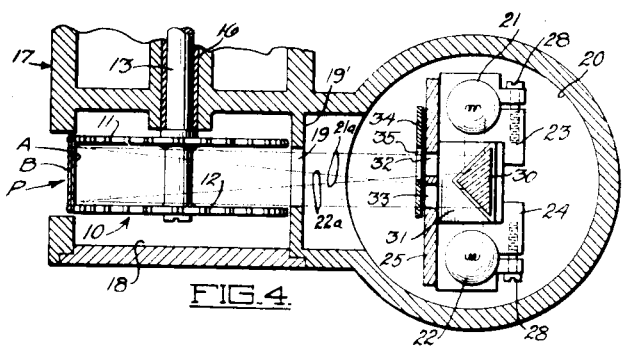
Fig. 4 is a sectional plan view taken substantially along the line 4—4 of Fig. 2.

The invention is illustrated in the drawings as applied to a continuous contact film printing machine for printing pictures on a motion picture film. A developed negative film A having picture frames therealong and a light sensitive film B are passed in contact past a printing point P (Fig. 1) by suitable film driving means including a printing sprocket 10. Sprocket 10 comprises two spaced sprocket wheels 11 and 12 mounted on a sprocket shaft 13 which is driven through a worm and worm wheel pair 14 by a three phase synchronous motor 15. However, any suitable motor may be employed with corresponding power circuit changes therefor. The sprocket shaft 13 is journalled in a bearing 16 (Fig. 4) formed in a printer casing 17.

Figure 3:
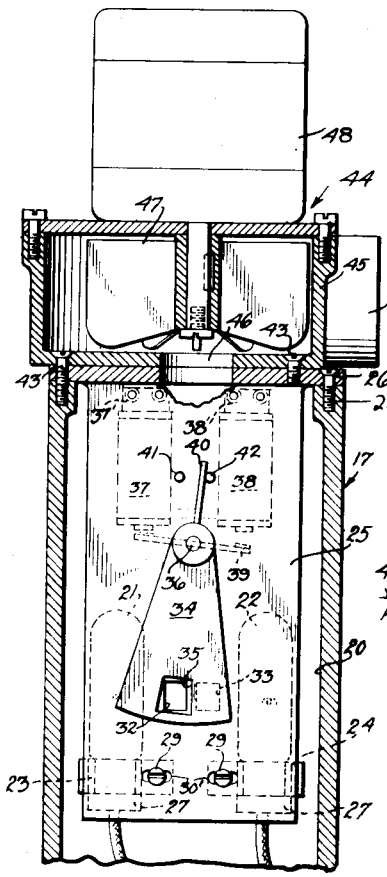
Fig. 3 is a sectional view through the printing machine and is taken substantially along the line 3—3 of Fig. 2.
Figure 2:
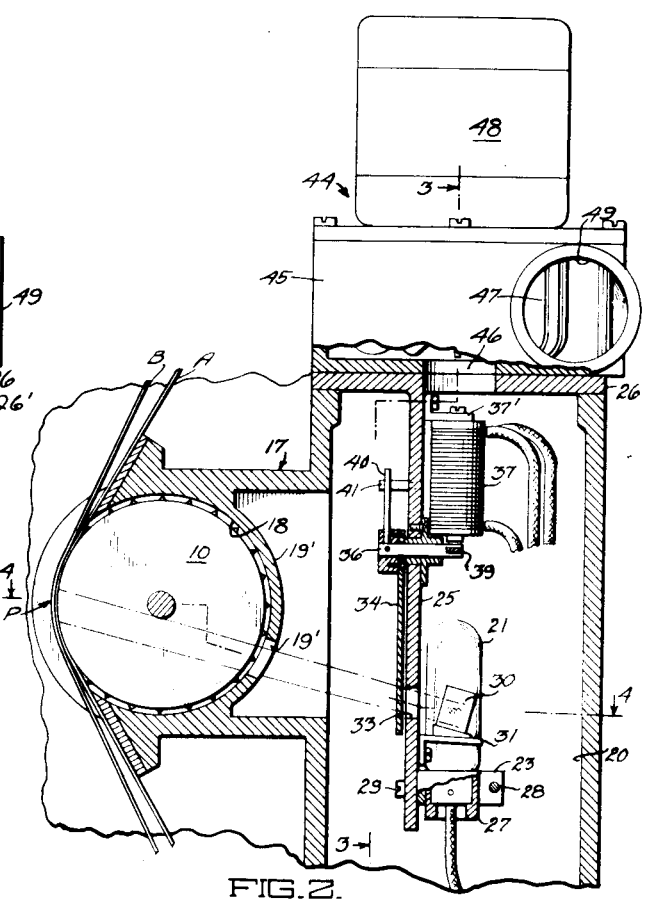
Fig. 2 is a transverse sectional view through a printing machine embodying the present invention.

Casing 17 forms a horizontally extending cylindrical printing chamber 18 housing the sprocket 10 and an adjacent vertically extending cylindrical printer lamp chamber 20. An opening 19 in a wall 19' communicates the chambers 18 and 20 to allow the printing light beams to pass from one chamber to the other. A pair of printing lamps 21 and 22 are provided in the chamber 20 and are carried by lamp mounts 23 and 24, respectively mounted on a vertical wall 25 depending from a circular flange 26 covering the chamber 20. Flange 26 is removably secured to the top of the casing 17 by screws 26' whereby the lamp assembly may be removed from the casing 20 to replace or adjust the lamps 21 and 22. Wall 25 forms a light baffle to prevent undesired light from the lamps 21 and 22 from passing into the printing chamber 18. Each of the lamps 21 and 22 is shown as having a cylindrical base 27 (Fig. 2) adjustable rotatably and vertically in its respective mount and adapted to be clamped in any adjusted position by a clamp screw 28. Each of the lamp mounts 23 and 24 is individually supported from the wall 25 by a screw 29 (Fig. 3) passing through an elongated slot 30' in the wall 25 whereby the mount and its respective lamp may be adjusted laterally.

A reflecting prism 30 is supported from the wall 25 by a bracket 31 to simultaneously reflect the light from the lamps 21 and 22 through spaced openings 32 and 33, respectively, in the wall 25. The light beams reflected by the prism 30 from the two lamps are directed in a converging manner toward a superposed position on the films A and B at the printing point P.

A light shutter 34 having an opening 35 therein is mounted on a stub shaft 36 journalled in a bearing provided in the wall 25. A pair of electro-magnets 37 and 38 are supported on the wall 25 on opposite sides of the shaft 36 by brackets 37' and 38', respectively, and are adapted to alternately attract an armature 39 secured to the shaft 36 and extending on opposite sides thereof to move the shutter 34 to alternately align the shutter openings 35 with the openings 32 and 33 in the wall 25. Movement of the shutter 34 is limited by means of a pin 40 extending upwardly from the hub of the shutter 34 and adapted to engage either of a pair of spaced pins 41 and 42 extending from the wall 25. The shutter assembly including shutter 34 is made as light as possible so as to minimize inertia and enable quick response thereof to the magnets 37 and 38.

It will be seen from the above that energization of the magnet 37 will cause the shutter 34 to be moved into a position wherein the opening 35 therein is aligned with the opening 32 in wall 25 so as to allow the light beam 21a from the lamp 21 to be directed onto the films at the printing point P while shuttering the light beam 22a from the lamp 22. Alternately, when the magnet 38 is energized the shutter 34 will be moved into a position to shutter the light beam 21a and allow the light beam 22a to be directed onto the films at the printing point.

The lamps 21 and 22 and magnets 37 and 38 are cooled by a centrifugal blower generally indicated at 44. The casing 45 of blower 44 is secured to the top of the circular flange 26 by screws 43 and has an opening 46 therein aligned with a similar opening in the flange 26 whereby a draft of air may be passed therethrough. A fan 47 mounted in the casing 45 and driven by a motor 48 mounted on top of casing 45 is adapted to exhaust air down through the opening 46 through an outlet 49 formed in the blower casing 45.

Figure 1:
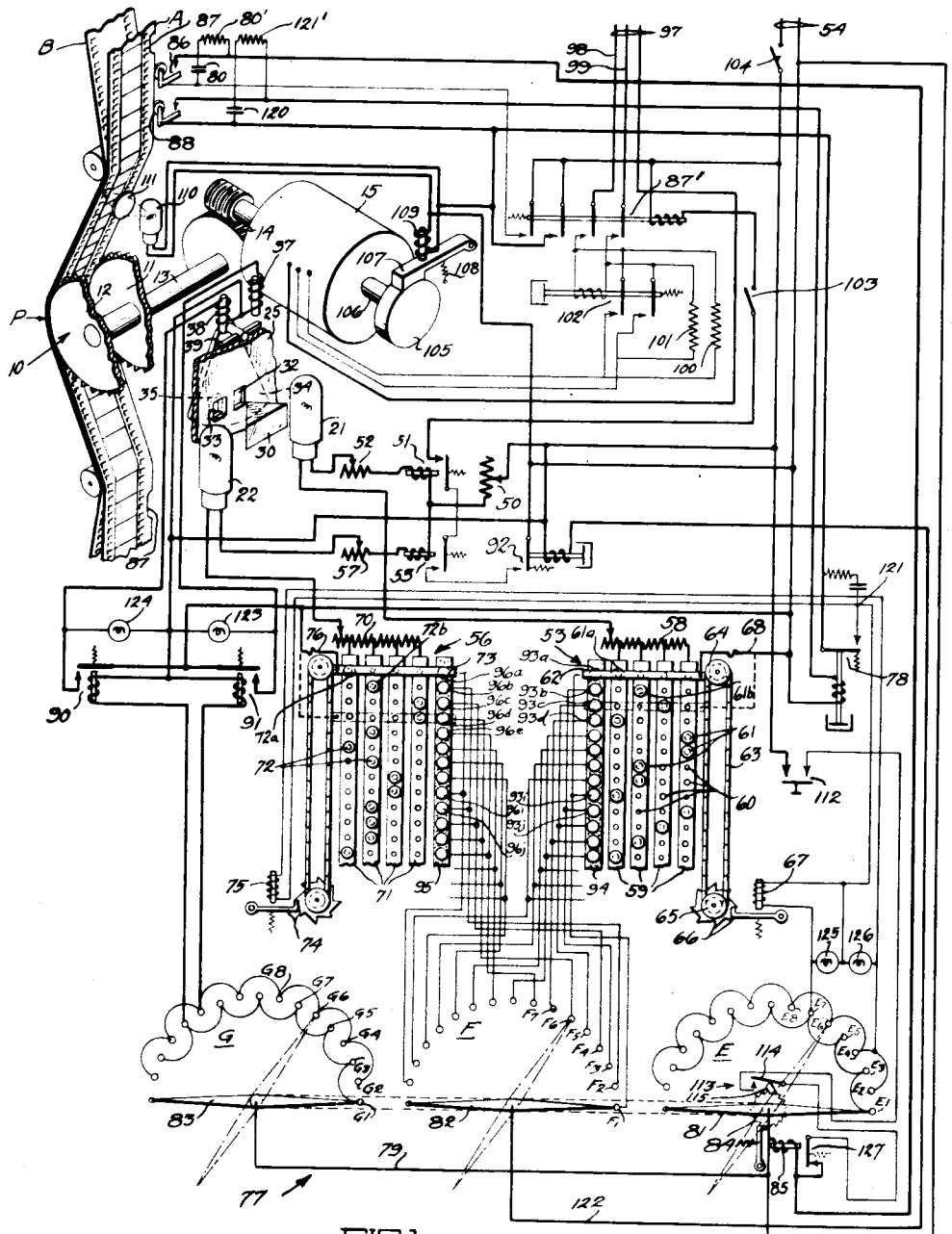
Fig. 1 is a diagrammatic view, partly in perspective, illustrating the printing apparatus and circuit connections therefor embodying the present invention.

Referring to Fig. 1 the filament of the lamp 21 is provided in series with a master rheostat 50, the energizing coil of a lamp failure relay 51, an individual rheostat 52, and an automatic rheostat, diagrammatically indicated at 53, across a direct current power circuit 54. The filament of lamp 22 is similarly connected in series with the master rheostat 50, the energizing coil of a second lamp failure relay 55, an individual rheostat 57, and a second automatic rheostat 56, across the power circuit 54.

The resistances 52 and 57 are provided to permit accurate balancing of the illumination of the two lamps 21 and 22. The master rheostat 50 permits common adjustment of the brilliance of the two lamps to compensate for blackening and aging of the lamps.

The automatic rheostat 53 is of a type well known in the art comprising a resistance 58 having parts thereof tapped to closely adjacent vertical metallic conductor strips 59. Equispaced holes 60 are provided in each of the strips 59 and are adapted to have contact plugs 61 fitted therein. A metallic contact bar 62 is shown as being movable vertically along the strips 59, but out of contact therewith by means of an endless chain 63 passing over spaced sprockets 64 and 65. The bar 62 is adapted to be moved a distance equal to the spacing of the holes 60, one step at a time, by means of a pawl and ratchet device 66 operatively connected to the sprocket 65 and energized by a stepping magnet 67. As the contact bar 62 is moved step by step down the length of the various strips 59, it contacts the various previously positioned plugs 61 provided in different ones of the strips 59 and thus completes the lamp circuit through a flexible conductor 68. Thus, as the contact bar 62 is stepped downward, the brilliance of the lamp 21 is varied according to the positions of the various plugs 61.

The automatic rheostat 56 is identical with that of 53 and comprises a resistance 70 tapped to various conductor strips 71 adapted to receive contact plugs 72. Plugs 72 are successively contacted by a contact bar 73 which is stepped by means of a pawl and ratchet device 74 operated by a stepping magnet 75. Contact bar 73 completes the lamp circuit through a flexible conductor 76.

The stepping magnets 67 and 75 are placed in circuit with a slow release relay 78 and a bank of contacts E of a selector switch generally indicated at 77. Switch 77 is preferably of a type known in the art as a Strowger rotary switch, and comprises three semi-circular banks of contacts E, F and G contacted by arms 81, 82 and 83, respectively. These arms are stepped from one contact to the next in unison by a pawl and ratchet device 84 actuated by a stepping magnet 85. Stepping magnet 85 is provided in series with a breaker switch 86 and a power relay 87' across the direct current supply circuit 54.

Breaker switch 86 rides against one edge of the negative film A only and is successively actuated by successive ones of a series of notches (as shown at 87) previously formed along the edge of the negative film to momentarily close the contacts thereof and consequently, (assuming the power relay 87' to be closed) to transmit an impulse to the stepping magnet 85 to step arms 81, 82 and 83 from one contact to the next. A condenser 80 and resistance 80' are provided in series with each other across the contacts of switch 86 to reduce arcing. The switch 86 is adapted to be adjusted in position toward or away from the printing point P along the film path in a manner not shown for different film speeds.

The various alternate contacts E1, E3, E5, etc. of the bank E are connected to one side of the stepping magnet 67 whereas the alternate contacts E2, E4, E6, etc. are connected together and to one side of the stepping magnet 75. The other side of each of the magnets 67 and 75 is connected at 121 to one of the contacts of the relay 78 which, when closed will transmit an impulse to either of the magnets 67 or 75, depending upon the position of the arm 81 of the contact bank E (assuming the power relay 78 to be closed as described hereinafter). The energizing coil of relay 78 is placed in series with a second breaker switch 88 identical with that of 86 and also adapted to be momentarily closed by the various notches 87 along the negative film. A condenser 120 and resistance 121' are placed in series with each other across the contacts of switch 88 to reduce arcing. Switch 88 is connected in series with the energizing coil of relay 78 and a set of contacts of the power relay 87 across the supply circuit 54 so as to momentarily energize the relay 78 when a notch 87 in the negative film A actuates switch 88. Switch 88 is adapted to be adjusted in position along the film path toward and away from the printing point P in a manner not shown, but it is preferably maintained at such a distance from the breaker switch 86 that a lapse of about one sixteenth of a second will occur between the tripping of these two switches 86 and 88 by a single notch 87 in the film A. Relay 78 is adjusted so as to remain closed approximately one sixteenth of a second after the switch 88 has momentarily closed and again opened, thus insuring that a sufficient amount of current is supplied to either magnet 67 or 75 to actuate the respective contact bar 82 or 73 operated thereby. Indicator lamps 125 and 126 are placed in shunt across the stepping magnets 67 and 75 to indicate the operation thereof.

The alternate contacts G1, G3, G5 etc. of the bank of contacts G of switch 77 are connected together and in series with the energizing coil of a quick acting shutter relay 90 to one side of the supply circuit 54. The arm 83 of bank G is connected by a line 79 to the other side of the supply circuit 54. Thus, when the arm 83 is stepped into contact with any of the above contacts G1, G3, etc. the relay 90 will be closed. The contacts of relay 90 are provided in series with the shutter actuating magnet 38 across the supply circuit 54 so as to cause the opening 36 in shutter 34 to be aligned with the opening 33 in wall 26 when this relay 90 is closed.

The alternate contacts G2, G4, G6, etc. are connected together and in series with the energizing coil of a second quick acting shutter relay 91 to one side of the supply circuit 54. Thus, when the arm 83 engages any of these contacts G2, G4, etc. the circuit through the coil of relay 91 will be closed to close this relay. The contacts of relay 91 are provided in series with the shutter magnet 37 across the supply circuit 54 so as to cause this magnet 37 to be energized when the arm 83 engages any of the contacts G2, G4, etc. Indicator lamps 123 and 124 are placed in shunt across the shutter magnets 37 and 38, respectively to indicate which printing lamp 21 or 22 is printing at any particular moment.

The arm 82 of the bank of contacts F of switch 77 is electrically connected by a line 122 in series with the energizing coil of a second slow release relay 92 to one side of the supply circuit 54. Relay 92 is preferably so adjusted that its contacts will remain closed for about one-eighth of a second after the coil thereof has been energized. The various contacts F1, F2, F3, F4, etc. of the bank F are connected to successive contact plugs 93a, 96b, 93b, 96c, etc. immovably secured on strips 94 and 95 of insulating material in a manner described hereinafter, to form part of a mislight checking circuit. Strip 94 is provided in the automatic rheostat 53 parallel to and closely adjacent one of the conductor strips 59. The plugs 93a, 93b, etc. are equi-spaced along the strip 94 and in line with the rows of holes 60 in the conductor strips 59 whereby, when the contact bar 62 is moved downward step by step along the various strips, successive ones of the plugs 93a, 93b, etc. will be contacted by the contact bar. Likewise strip 95 is placed closely adjacent one of the conductor strips 71 in the automatic rheostat 56 and is adapted to have the successive ones of the plugs 96a, 96b, etc. thereon (spaced identically the same as the holes along the strips 71) contacted by the contact bar 73 as it is moved downward step by step. The contacts F1, F2, F3, etc. are connected as follows to the various plugs on strips 94 and 95. Contact F1 is connected to plug 93a; contact F2 is connected to plug 96b; contact F3 is connected to plug 93b; contact F4 is connected to plug 96c, etc. Due to the fact that each of the automatic rheostats may have a hundred or more scene change settings, i. e. one hundred or more holes 60 provided along each conductor strip thereof, it is impracticable to assign a separate contact F1, F2, etc. to each separate contact plug on the insulated strips 94 and 95. To overcome this, I make use of a rotary switch F having sixteen contacts F2, F3, etc. and so arrange the connections from the rotary switch F to each of the automatic rheostats 53 and 56 that eight of the alternating contacts on switch F serve one of these automatic rheostats and the remaining eight alternate contacts on switch F serve the other automatic rheostat. Therefore, each of the sets of eight contacts on rotary switch F may serve a very large number of contacts on each of the automatic rheostats 53 and 56. For this purpose, I connect the contacts on each of the automatic rheostats 53 and 56, respectively, in groups in parallel to the rotary switch F in such manner that after the contact bar of either of the automatic rheostats 53 and 56 has made eight steps, that bar will complete a connection to the same contact on the rotary switch F as was completed when that bar was in its initial position for that particular series of eight steps. Therefore, contact plugs 93a, 93i, etc. are connected together and contact plugs 93b, 93j, etc. are connected together, etc. Also, contact plugs 96a, 96i, etc. are connected together and contact plugs 96b, 96j, are connected together etc. Thus, when the arm 82 is contacted in series with either the contact arm 62 or the contact arm 73, a circuit will be closed through the coil of the relay 92 to close the same for the purpose described hereinafter.

It will be seen from the above that two counting devices, in effect, are provided. One of these comprises the plugs 93 and 96 provided on the strips 94 and 95, respectively, which are successively contacted by the arms 62 and 73, respectively, actuated under control of the breaker switch 88. The other of these counting devices comprises the rotary switch 77 having the series of contacts F1, F2, etc., which switch is actuated by the other breaker switch 86. Therefore, there are two separate electric channels which must be actuated in timed relation with each other to maintain the apparatus in operation.

The motor 15 is driven by a three phase alternating current supply circuit 97. Two lines 98 and 99 of the supply circuit 97 pass through the relay 87' and have provided in series therewith a pair of starting resistances, or reactances 100 and 101, respectively, whereby the motor 15 may be brought slowly up to its normal operating speed. The reactances or resistances 100 and 101 are adapted to be short circuited by a time delay relay 102, the energizing coil of which is adapted to be connected in circuit across lines 98 and 99 of circuit 97 by power relay 87'. Relay 102 is so adjusted that its contacts close at approximately three seconds after the coil thereof is energized by the power relay 87'.

The energizing coil of power relay 87' is provided in series with a start switch 103, the contacts of the lamp failure relays 51 and 55 and the slow release relay 92 across the direct current supply circuit 54 so as to close the relay 87' when the start switch 103 is closed (assuming that a master switch 104 in the circuit 54 and the relays 51, 55 and 92 are closed.)

A brake drum 105 mounted on the drive shaft 106 of motor 15 is adapted to be engaged by a brake shoe 107 normally held in frictional braking engagement therewith by a spring 108. Shoe 107 is adapted to be retracted from braking engagement by a solenoid 109 placed in series with the relay 87' across the power circuit 54.

A small printing lamp 110 focused by means of a lens 111 in the path of the edge or code numbers along the edge of the negative film A is provided in shunt with the solenoid 109 so as to be illuminated when the power relay 87' is closed. Lamp 110 thus serves to print the edge numbers occurring between one set of sprocket holes and the adjacent edge of negative A onto the film B.

The arms 81, 82 and 83 of rotary switch 77 are adapted to be rotated into the starting position shown by the full lines of Fig. 1 wherein the arms 81, 82 and 83 engage the contacts E1, F1, and G1, respectively, by a homing circuit comprising normally open push button 112 placed in series with a homing device generally indicated at 113 across the power circuit 54. Homing device 113 may be of any well known type but is illustrated as comprising a normally closed switch 114 adapted to be open by a cam 115 when the arms 81, 82 and 83 have reached their starting positions. Arm 115 is operatively connected to the arm 81 in a manner not shown and is rotatable therewith. Switch 114 is provided in series with a second normally closed switch 127 adapted to be opened by the stepping magnet 85 when energized. When the push button 112 is closed to energize the homing circuit (assuming the arms 81, 82 and 83 to be out of engagement with the respective contacts E1, F1 and G1) the stepping magnet 85 will be energized to cause the pawl and ratchet device 84 to step the arms from one contact to the next. This action will cause the stepping magnet 85 to open switch 127. This will de-energize magnet 85, causing the switch 127 to again close and preparing the pawl and ratchet device for the next step. When the arms reach their starting positions the cam 115 will open switch 114 to thus stop the operation of the homing device.

*Operation*

The printing apparatus is set up as follows. The negative film to be printed is first checked to determine the desired printer light intensity for each scene or section thereon. The negative is then notched as at 87 along one edge thereof at the points where changes in printer light intensity are to occur. These notches are not placed at the exact point where such printer light intensity is to change but are placed behind such point a distance equal to the distance between the breaker switch 86 and the printing point P plus a distance determined by the time delay caused by the rotary switch 77, the quick acting relays 90 and 91 and the shutter 34.

Note is made of the desired printing light changes for the various scenes and the various plugs 61 in the automatic rheostats 53 and 56 are placed in the corresponding positions along the conductor strips 59 and 71, respectively. These various plugs 61 are placed as follows. The printer light intensity to be placed in the printer lamp circuit of the first scene is determined and a contact plug as at 72a is placed accordingly in the top hole of the one of the strips 71 of automatic rheostat 56 which corresponds to the particular resistance required. Thus the lamp 22 will be illuminated at this desired intensity for the first scene. A plug as at 61a is then placed in the top hole of the one of the conductor strips 59 of automatic rheostat 53 which corresponds to the particular resistance required for the second scene. Thus, when the contact bars 62 and 73 are moved to their uppermost positions the lamp 22 will be illuminated at the correct intensity for the first scene and the lamp 21 will be illuminated at the correct intensity for the second scene. A plug as at 72b is then placed in the second hole of the one of the strips 71 of rheostat 56 which corresponds to the particular resistance required for the third scene. This procedure is followed for all of the scenes or sections of the film A wherein the printing light intensity is to be changed. Thus, it will be seen that the printer light intensity for the successive odd numbered scenes are determined or set up by the successive plugs 72 along the strips 71 of rheostat 56 while the light intensity of the successive even numbered scenes are determined or set up by the successive plugs 61 on the automatic rheostat 53. One more plug is placed in the rheostat opposite the one in which the plug corresponding to the last scene is placed so as to prevent one lamp circuit from being opened when the last scene is being printed.

The first step in the operation of the printing apparatus is to thread the negative film A and the sensitive film B in contact with each other in the printing apparatus and to raise the contact arms 62 and 73 of automatic rheostats 53 and 56, respectively, to their upper positions illustrated by the full lines in Fig. 1. The master switch 104 in the direct current supply circuit 54 is then closed to close both printing lamp circuits, thereby causing the lamp 22 to be illuminated at the desired intensity for the first scene and the lamp 21 to be simultaneously illuminated at the intensity predetermined for the second scene. Closing of the lamp circuits also causes the lamp failure relays 51 and 55 to be closed, assuming, of course, that the lamps 21 and 22 are not burnt out.

The push button 112 is then closed and held in this position for a short time to cause the homing device 113 to rotate the arms 81, 82 and 83 into their starting position as indicated by the full lines of Fig. 1. When in this position a circuit is completed through the energizing coil of the slow release relay 92, line 122, the arm 82 of the bank of contacts F and the contact F1 to the first contact plug 93a on the insulator strip 94 of automatic relay 53, and through the contact bar 62, the circuit being provided across the direct current supply circuit 54, thus causing the relay 92 to close.

Also, when the arms 81, 82 and 83 are in their starting position, the arm 83 will engage the contact G1 of the bank G to complete a circuit through the quick acting relay 90 across the power supply circuit 54, thus closing this relay to cause the magnet 38 to attract the armature 39 and thus move the mask 34 into a position wherein the opening 35 therein is aligned with the opening 33 allowing the beam of light from the lamp 22 (illuminated at the desired intensity for scene #1) to be passed therethrough and impinge upon the films A and B at the printing point P.

Thereafter, the starting switch 103 is closed to close the circuit through the energizing coil of the power relay 87' (assuming the relays 51, 55 and 92 are closed) thereby closing relay 87'. As the relay 87' is closed three phase current is supplied to the motor 15 to start the same while simultaneously releasing the brake 107 and illuminating the edge numbered printing lamp 110. Approximately three seconds after the starting switch 103 has been closed the time delay relay 102 will close, thereby short circuiting the starting resistances 100 and 101 to bring the motor 15 up to its normal printing speed.

Thus, the first scene or section of the film A will be printed onto the film B by light from the printing lamp 22 while the light from the lamp 21, (illuminated at the intensity predetermined for the next scene) is shuttered by shutter 34.

As the first notch 87 passes and actuates the first breaker switch 86, an impulse is momentarily transmitted to the stepping magnet 85 of the rotary switch 77 so as to rotate the arms 81, 82 and 83 into their next successive positions in engagement with the contacts E2, F2, and G2, respectively. In this position, a circuit will be closed through the arm 83, contact G2, and the quick acting relay 91 so as to energize the shutter magnet 37 to quickly throw the shutter 34 into its alternate position wherein the light beam from the lamp 21 will be directed to the films. It will be noted that since the arm 82 has been moved to the contact F2 the circuit through the energizing coil of the slow release relay 92 will be broken since the contact arms 62 and 73 are still in their upper positions (as illustrated in Fig. 1). However, due to the slow release characteristic of relay 92, it will maintain the contacts thereof closed for a period of approximately one-eighth of a second after the circuit through the energizing coil thereof has been broken. Approximately one-sixteenth of a second after the breaker switch 86 has been momentarily closed by a notch 87 in the film A, this notch will momentarily close the second breaker switch 88 whereby to energize the slow release relay 78. As relay 78 is closed, it will close a circuit through the stepping magnet 75 of automatic rheostat 56, through the contact E2 and arm 81 across the supply circuit 54 so as to cause the contact arm 73 to be stepped down to the next contact button 72b to cause the lamp 22 (now shuttered) to be illuminated at an intensity predetermined for the third scene. Since the contact 82 has moved to the contact F2, a circuit will now be resumed through the arm 82, contact plug 96b and the contact arm 73 to again energize the relay 92. Since this action takes place in less than one-eighth of a second, the relay does not have a chance to open under normal operation. However, if any of the stepping devices 84, 66 or 74, or the breaker switches 86, or 88, or the relay 78 fail to function properly, or if the D. C. power supply 54 should fail, the circuit through the coil of relay 92 will be interrupted more than one-eighth second, thereby allowing the relay to open to cause the motor 15 to automatically stop.

As the second notch 87 passes the breaker switch 86, the rotary switch 77 is again moved one step to cause the shutter 34 to again uncover lamp 22 (now illuminated at the predetermined intensity for the third scene). Switch 77, at this time, also prepares the circuit for the stepping magnet 67 and for the slow release relay 92. When the second notch 87 passes the breaker switch 88, the relay 78 is closed to cause the magnet 67 to step the contact bar 62 down to the next level, thereby completing the mislight checking circuit through the relay 92.

The above operation is continued for the successive scenes until the last scene is reached. When the last notch (punched in the edge of film A at the end of the last scene) actuates the breaker switch 86, the rotary switch will be stepped as usual, but when the second breaker switch 88 is actuated to step the corresponding one of the contact bars 62 or 73 downward to the next contact level, one of the lamp circuits will be opened due to the absence of a contact plug at this level. Thus the motor 15 is automatically stopped.

The checking or counting device embodied in the present invention may be incorporated in any printer apparatus using an automatically operated rheostat device as at 53 or 56 by utilizing the rotary switch 77, a conductor strip as at 94 or 95 having the successive plugs thereon connected to the succession switch contacts as at F1, F2 etc., and a separate breaker switch as at 86 actuated by one of the films, preferably the developed film.

Although the invention is shown as being incorporated in and is especially applicable to continuous contact printing apparatus for printing pictures, certain aspects of the invention may also be employed in projection printers, step by step printers, or other film exposing devices. When the invention is employed in step by step printers, the operation of switching from one light to the other may be so timed as to occur during the shuttered period, that is, during the period when the printing and printed films are being stepped to position next successive film frames in the printing aperture during which period a separate shutter (not shown) would be employed to shutter the printing beam. Also, of course, the invention may be applied to printing apparatus for printing color picture films. In connection with printing color films, the invention is very important due to the fact that the density control of color films is very critical, necessitating frequent and accurate adjustments of the printing light illumination.

Furthermore, the invention may be applied to sound track printers where it is desired to change the density of certain parts of the sound track being printed. Therefore, I desire it to be understood that modifications may be made and that no limitations upon the invention are intended other than are imposed by the scope of the appended claims.

I claim:

1. Film printing apparatus comprising the combination of means forming a film gate, a pair of printing lamps, means for alternately directing the light beams from said lamps onto said film gate, means for illuminating said lamps and film operated means for varying the intensity of illumination of one of said lamps when the light beam of the other of said lamps is directed onto said film gate.

2. A film printing apparatus comprising the combination of means forming a film path, means forming a pair of printing light beams directed in super position on the same side of said film path, a shutter in the path of each of said beams, means for actuating said shutter to alternately shutter said beams, and means under control of said last mentioned means for varying the intensity of illumination of said beams.

3. A film printing apparatus for printing from a developed film to a sensitized film comprising means forming a film path, means for passing said developed film through said path, a pair of printing lamps, means for directing beams of light alternately from said lamps on said developed film, and means under control of said film for actuating said last mentioned means.

4. Film printing apparatus for printing from a printing film to a sensitized film, one of said films having notches therealong, which comprises the combination of means for moving said films in printing relation through a predetermined path, a pair of printing lamps, film controlled means for illuminating said lamps at different intensities, and means under control of said notches for alternately directing the light beams from said lamps on said printing film, whereby to successively print said films with light having varying itnensities.

5. Film printing apparatus for printing from a printing film to a sensitized film, one of said films having notches therealong, which comprises the combination of means for moving said films in printing relation through a predetermined path, a pair of printing lamps, means for concomitantly illuminating said lamps, means under control of said notches for alternately directing the light beams from said lamps toward the same point in the path of movement of said films, and means under control of said notches for changing the intensity of illumination of one of said lamps when the beam from the other of said lamps is directed onto said film.

6. Film printing apparatus comprising the combination of means for moving a developed film and a sensitized film in printing relation through a predetermined path, a printing lamp, means for directing a light beam from said lamp toward said films to print said films, a shutter adapted to intercept said light beam, means under control of a notch in one of said films for moving said shutter into light intercepting position, means under control of a second notch in one of said films for moving said shutter out of light intercepting position, and means under control of one of said notches for varying the intensity of illumination of said lamp when said light beam thereof is intercepted.

7. Film printing apparatus comprising the combination of means for moving a developed film and a sensitized film in printing relation through a predetermined path, a pair of printing lamps, means for directing the light beams from said lamps onto said films at the same point in said path of said films, a shutter, means actuated by a notch in one of said films for actuating said shutter to intercept one of said beams, means actuated by a second notch in one of said films for actuating said shutter to intercept the other of said beams, and means under control of one of said notches for varying the intensity of illumination of one of said lamps when the beam thereof is intercepted.

8. Film printing apparatus comprising the combination of means for moving a developed film and a sensitized film in printing relation, means for directing a pair of printing light beams onto said films, a shutter, means comprising a shutter circuit adapted to move said shutter to intercept one of said beams, means comprising a second shutter circuit adapted to move said shutter to intercept the other of said beams, switching means adapted to be actuated by a notch in one of said films for energizing said first mentioned shutter circuit and adapted to be actuated by a second notch in one of said films for energizing said second shutter circuit.

9. Film printing apparatus comprising the combination of means for moving a developed film and a sensitized film in printing relation, a pair of printing lamps, a power circuit for illuminating said lamps, means for directing the light beams from said lamps alternately onto said films, a selector switch movable in different positions and a stepping magnet therefor, switch means and connections therefor adapted to be actuated by notches in one of said films for energizing said magnet, means comprising a circuit adapted to be energized by said selector switch when in one position thereof for actuating said second mentioned means to direct the light beam from one of said lamps onto said films, means comprising a second shutter circuit adapted to be energized by said selector switch when in a different position thereof to direct the light beam from the other of said lamps onto said films, a variable resistance in said power circuit, and means comprising said selector switch when in one position thereof for varying the intensity of illumination of one of said lamps when the light beam from the other of said lamps is directed onto said films.

10. Film printing apparatus according to claim 9 comprising a relay and circuit connections therefor for actuating said first mentioned means, and a circuit for energizing said relay comprising in series, said selector switch and said variable resistance.

11. Film printing apparatus comprising the combination of means for moving a printing film and a sensitized film in printing relation through a predetermined path, a pair of printing lamps, means for alternately directing the light beams from said lamps onto said films for printing said films, circuit means comprising a selector switch and a stepping magnet therefor for energizing said last mentioned means, an energizing circuit for said magnet comprising a switch adapted to be actuated by notches in one of said films, and means for varying said lamps under control of the stepping of said switch.

12. Film printing apparatus comprising the combination of means for moving a printing film and a sensitized film in printing relation through a predetermined path, means for directing a pair of printing light beams onto said films for printing said films, a shutter means adapted in one position to intercept one of said beams, and adapted in another position to intercept the other of said beams, means comprising a circuit for moving said shutter means into one of said positions, means comprising a second circuit for moving said shutter means into the other of said positions, a selector switch adapted in one position to energize one of said circuits and adapted in another position to energize the other of said circuits, a stepping magnet for said selector switch, and an energizing circuit for said magnet comprising a switch adapted to be actuated by notches in one of said films.

13. Film printing apparatus comprising the combination of means for passing a printing film and a sensitized film in printing relation through a predetermined path, a printing lamp, a second printing lamp, an electric power circuit for illuminating said lamps, means comprising a selector switch adapted in one position of said switch to direct the light beam from said first mentioned lamp onto said films at a printing point to print said films and adapted in a second position of said switch to direct the light beam from said second lamp onto said films at said printing point to print said films, means for successively moving said selector switch from one of said positions to the other when successive predetermined portions of one of said films pass said printing point, a variable resistance device in said circuit for controlling the illumination of said first lamp, a second variable resistance device in said circuit for controlling the illumination of said second lamp, means comprising said switch when in said first mentioned position of said switch for actuating said second variable resistance device and means comprising said switch when in said second position of said switch for actuating said first mentioned variable resistance device.

14. Film printing apparatus according to claim 13 wherein said means for successively moving said selector switch comprises an energizing circuit and a switch in said last mentioned circuit adapted to be actuated by notches in one of said films.

15. Film printing apparatus comprising the combination of means for passing a printing film and a sensitized film in printing relation through a predetermined path, a circuit comprising switching contacts of a relay for energizing said means, a pair of printing lamps adapted to print said films at a certain point in said path, an electrical power supply for said lamps, respective means for individually varying said electrical power for said lamps whereby to individually vary the intensity of illumination thereof, means comprising a selector switch adapted in one position thereof to actuate one of said last mentioned means and adapted in another position thereof to actuate the other of said last mentioned means, means for alternately moving said switch into said two mentioned positions when successive predetermined parts of said films pass said point, separate circuits for energizing said relay to close said contacts thereof, and means whereby said switch is adapted to energize one of said circuits when in one of said positions thereof and adapted to energize the other of said circuits when in the other of said positions thereof.

16. In a film printing apparatus, the combination of means forming a beam of light, means for passing a film through said beam, means for varying the intensity of illumination of said beam, film controlled means for preparing said intensity varying means for operation, and other film controlled means for completing actuation of said last mentioned means.

17. In a film printing apparatus, the combination of means forming a beam of light, means for passing a film having notches therealong through said beam, means for varying the intensity of illumination of said beam, a circuit controlling said last mentioned means, a slow release relay for maintaining said circuit operative for a prolonged period of time, and means momentarily actuated by successive ones of said notches to operate said relay, whereby said circuit is maintained operative after said last mentioned means has ceased to operate.

18. Film printing apparatus comprising the combination of a film operated breaker switch, a step by step rheostat controlled thereby, and means operative on movement of said breaker switch to one position for initiating control of the operation of said rheostat and for maintaining control of the operation of said rheostat when said breaker switch is moved to an alternate position.

19. The method of printing films which comprises directing at different times a plurality of light beams onto the same printing area, preparing a record of printing changes, moving said record with the films, cyclically rendering each beam ineffective to print and pre-setting its intensity while printing from another pre-set beam, and controlling said rendering and pre-setting in timed relation with the movement of said record.

20. The method of printing onto a sensitized film from a printing film having sequences requiring different printer light intensities which comprises printing said sequences at the same printing point from a plurality of beams of light in cyclic order, preparing a record of printing changes required by said sequences, moving said record with the films, and periodically adjusting the light intensity of the inactive beam in timed relation with the movement of said record while printing from another of said beams.

21. Film apparatus comprising the combination of means providing a printing gate, a plurality of light beams therefor, film controlled means for rendering said beams active in cyclic order, and other film controlled means for adjusting the intensity of an inactive beam while printing from an adjusted beam.

22. Printing apparatus comprising the combination of a printing lamp, a step-by-step resistance device therefor having a certain number of steps, a rotary step-by-step switch having a number of contacts which is a sub-multiple of said steps, each of said contacts connected in multiple to steps on said resistance device which are separated by said number, and film operated means controlling said rotary switch to vary the resistance in circuit with said lamp.

23. Printing apparatus comprising the combination of a pair of printing lamps, light intensity controlling means for each of said lamps, a circuit for each of said means, a rotary step-by-step switch having contacts, alternate ones of said contacts being in one of said circuits and the remaining alternate contacts being in the other of said circuits, and film operated means controlling said rotary switch.

FREDERICK WILLIAM ROBERTS.